United States Patent
Hogg et al.

(10) Patent No.: US 7,647,271 B2
(45) Date of Patent: *Jan. 12, 2010

(54) SYSTEM AND METHOD FOR COMMODITY VALUATION BASED ON ONLINE AUCTION BID INFORMATION

(75) Inventors: Tad Hogg, Mountain View, CA (US); Bernardo A. Huberman, Palo Alto, CA (US)

(73) Assignee: Xerox Corporation, Norwalk, CT (US)

( * ) Notice: Subject to any disclaimer, the term of this patent is extended or adjusted under 35 U.S.C. 154(b) by 181 days.

This patent is subject to a terminal disclaimer.

(21) Appl. No.: 11/634,541

(22) Filed: Dec. 4, 2006

(65) Prior Publication Data

US 2007/0078756 A1 Apr. 5, 2007

Related U.S. Application Data

(63) Continuation of application No. 09/732,595, filed on Dec. 8, 2000, now Pat. No. 7,146,334.

(51) Int. Cl.
*G06Q 40/00* (2006.01)
(52) U.S. Cl. .......................................... 705/37; 705/26
(58) Field of Classification Search .................... 705/37, 705/26
See application file for complete search history.

(56) References Cited

U.S. PATENT DOCUMENTS

| | | | |
|---|---|---|---|
| 4,789,928 A | 12/1988 | Fujisaki | |
| 5,101,353 A | 3/1992 | Lupien et al. | |
| 5,615,269 A | 3/1997 | Micali | |
| 5,826,244 A | 10/1998 | Huberman | |
| 5,835,896 A | 11/1998 | Fisher et al. | |
| 5,873,071 A | 2/1999 | Ferstenberg et al. | |
| 5,895,453 A * | 4/1999 | Cook | 705/22 |
| 5,905,974 A | 5/1999 | Fraser et al. | |
| 5,905,975 A | 5/1999 | Ausubel | |
| 5,924,083 A | 7/1999 | Silverman et al. | |
| 6,005,926 A | 12/1999 | Mashinsky | |
| 6,023,686 A | 2/2000 | Brown | |
| 6,026,383 A | 2/2000 | Ausubel | |
| 6,035,289 A | 3/2000 | Chou et al. | |
| 6,055,518 A | 4/2000 | Franklin et al. | |
| 6,055,519 A | 4/2000 | Kennedy et al. | |
| 6,078,906 A | 6/2000 | Huberman | |
| 6,098,051 A | 8/2000 | Lupien et al. | |
| 6,101,484 A | 8/2000 | Halbert et al. | |
| 6,119,100 A | 9/2000 | Walker et al. | |
| 6,151,589 A | 11/2000 | Aggarwal et al. | |
| 6,161,099 A | 12/2000 | Harrington et al. | |
| 6,167,386 A | 12/2000 | Brown | |
| 6,223,167 B1 | 4/2001 | Alaia et al. | |
| 6,332,129 B1 | 12/2001 | Walker et al. | |
| 6,397,193 B1 | 5/2002 | Walker et al. | |
| 6,493,682 B1 | 12/2002 | Horrigan et al. | |

(Continued)

*Primary Examiner*—Jagdish N Patel
(74) *Attorney, Agent, or Firm*—Patrick J. S. Inouye; Scott E. Smith

(57) ABSTRACT

A system for determining latent demand for at least one of a plurality of commodities includes an offer analyzer and a commodity selector. The offer analyzer analyzes at least a plurality of initially unaccepted offers for each of the plurality of commodities. The commodity selector selects at least one of the plurality of commodities to offer for sale which satisfies at least one criteria based on the analysis by the offer analyzer.

17 Claims, 3 Drawing Sheets

U.S. PATENT DOCUMENTS

| | | |
|---|---|---|
| 6,922,676 B2 | 7/2005 | Alnwick |
| 6,934,690 B1 | 8/2005 | Van Horn et al. |
| 6,944,599 B1 * | 9/2005 | Vogel et al. .................. 705/37 |
| 7,130,807 B1 | 10/2006 | Mikurak |
| 7,248,719 B2 | 7/2007 | Hoffman et al. |
| 7,330,826 B1 | 2/2008 | Porat et al. |
| 7,490,061 B2 | 2/2009 | Kathwari et al. |
| 7,505,919 B2 | 3/2009 | Richardson |
| 7,558,746 B2 | 7/2009 | Alaia et al. |
| 2002/0065769 A1 | 5/2002 | Irribarren et al. |
| 2003/0014326 A1 | 1/2003 | Ben-Meir et al. |
| 2005/0108140 A1 | 5/2005 | Motte et al. |
| 2006/0178980 A1 | 8/2006 | Goldberg et al. |
| 2006/0184447 A1 | 8/2006 | Nieboer et al. |

* cited by examiner

| COMMODITIES | A | B | C | AB | AC | BC | ABC |
|---|---|---|---|---|---|---|---|
| BIDS BIDDER 1<br>2<br>3<br>4 | 1<br>2<br>1<br>3 | 2<br>1<br>2<br>1 | 6<br>4<br>3<br>2 | 3<br>12<br>3<br>4 | 9<br>8<br>7<br>7 | 6<br>7<br>6<br>4 | 10<br>12<br>10<br>9 |
| AGGREGATE SUM OF BIDS | 7 | 6 | 15 | 22 | 31 | 23 | 41 |
| AVERAGE (DIVIDE BY NUMBER OF BIDDERS) | 1.75 | 1.5 | 3.75 | 5.5 | 7.75 | 5.75 | 10.25 |
| VALUE/NUMBER OF ITEMS | 1.75 | 1.5 | 3.75 | 2.75 | 3.875 | 2.875 | 3.417 |

*FIG. 3*

SYSTEM AND METHOD FOR COMMODITY VALUATION BASED ON ONLINE AUCTION BID INFORMATION

CROSS-REFERENCE TO RELATED APPLICATION

This patent application is a continuation of U.S. patent application Ser. No. 09/732,595 filed on Dec. 8, 2000 U.S. Pat. No. 7,146,334, issued on Dec. 5, 2006, the priority filing date of which is claimed, and the disclosure of which is incorporated by reference.

FIELD

The present invention relates to a system and method for determining latent demand for a commodity, for instance, a good, service, or combination of goods and services, based on prior offers or bids for the commodity.

BACKGROUND

Potential sales volume and demand, as well as appropriate pricing policies, for different goods and services are difficult to determine. These determinations become even more difficult when different combinations of goods and services are bundled together for sale because buyers and sellers may value a combination or set of goods and services differently from the sum of their individual values. Attempts to survey the market for all possible combinations of goods and services to help with these determinations are prohibitively expensive. As a result, it is difficult for sellers to identify an appropriate good, service, or combination of goods and services to sell, at what price, and the expected demand.

One way to determine an appropriate price for a good, service, or combination of goods and services is through an auction. Typically, in an auction, participants provide bid information about what they are willing to pay for a good, service, or combination of goods and services being auctioned by an auctioneer or auction system. In an auction, bid information is collected and is used to determine which participant's bid is finally accepted, typically the highest price bid. The participant whose bid is accepted and the party with the good, service, or combination of goods and services being bid on, then exchange the good, service, or combination of goods and services at the accepted price.

Accordingly, this auction mechanism effectively determines a price for one good, service, or combination of goods and services between a buyer and seller. This mechanism makes use of only a very limited portion of the submitted bid information, for instance, the highest bid. The remaining portions of the bid information provided by the participants are simply discarded.

SUMMARY

A method for determining latent demand for at least one of a plurality of commodities in accordance with one embodiment includes analyzing at least a plurality of initially unaccepted offers for each of the plurality of commodities and then selecting at least one of the plurality of commodities to offer for sale which satisfies at least one criteria based on the analyzing.

A system for determining latent demand for at least one of a plurality of commodities in accordance with another embodiment includes an offer analyzer and a commodity selector. The offer analyzer analyzes at least a plurality of initially unaccepted offers for each of the plurality of commodities. The commodity selector selects at least one of the pluralities of commodities to offer for sale which satisfies at least one criteria based on the analysis by the offer analyzer.

A computer readable medium having stored thereon instructions for identifying latent demand for at least one of a plurality of commodities in accordance with another embodiment includes instructions to be executed by a processor for analyzing at least a plurality of initially unaccepted offers for each of the plurality of commodities and selecting at least one of the plurality of commodities to offer for sale which satisfies at least one criteria based on the analyzing.

With the present invention, demand and potential sales volume, as well as an appropriate pricing policy, for a different good or service easily can be determined based on the unsuccessful bids or the offers for each of the goods or services. Additionally, the present invention is able to identify combinations of goods and services that are particularly highly valued. This is particularly beneficial because attempting to survey the market for all possible combinations of goods and services could be prohibitively expensive.

BRIEF DESCRIPTION OF THE DRAWINGS

FIG. 3 is a table illustrating one example of offers for a plurality of commodities.

DETAILED DESCRIPTION

Figure 1:
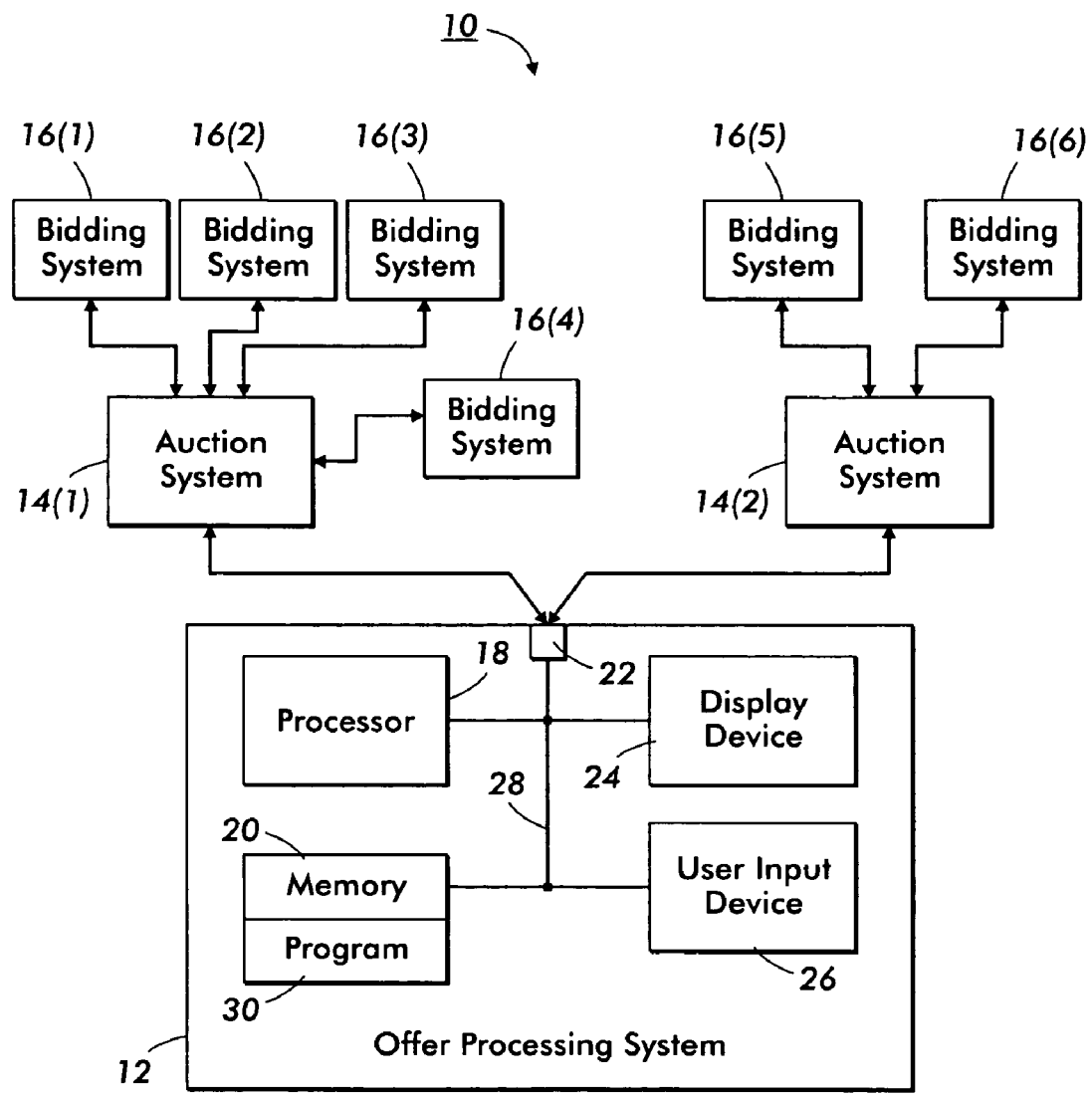
FIG. 1 is a diagram of a system for determining latent demand for at least one of a plurality of commodities.
Figure 2:
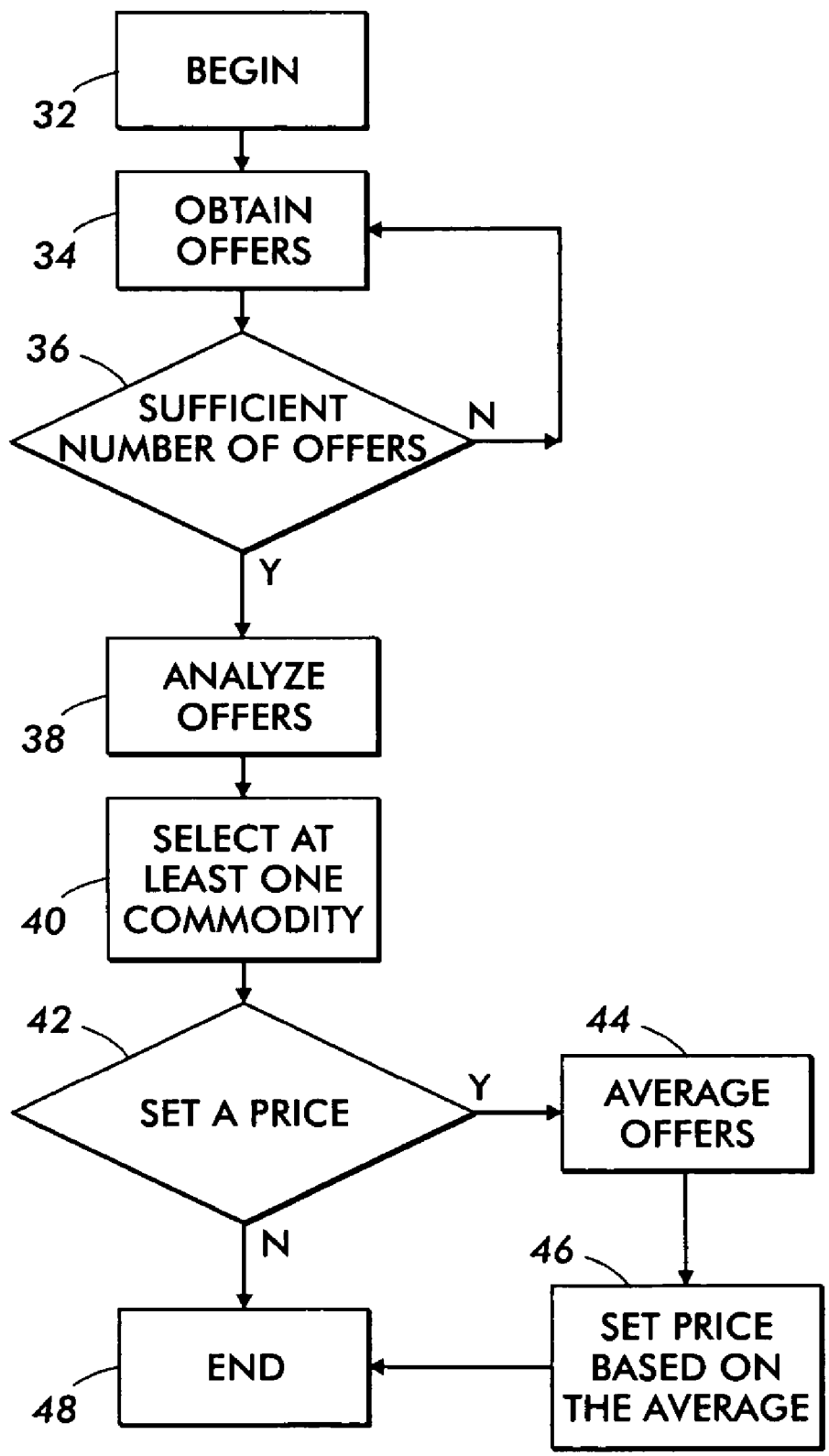
FIG. 2 is a flow chart of a method for determining latent demand for at least one of a plurality of commodities.

A system 10 and method for determining latent demand for at least one of a plurality of commodities in accordance with one embodiment is illustrated in FIGS. 1 and 2. The system and method analyze at least a plurality of initially unaccepted offers for each of the plurality of commodities and then selects at least one of the plurality of commodities to offer for sale which satisfies at least one criteria based on the analysis. A commodity is a useful or valued good, service, or combination of goods and services. The present invention advantageously provides a system for identifying latent demand for a good, service, or combination goods and services.

Referring to FIG. 1, the system 10 includes an offer processing system 12, auction systems 14(1) and 14(2), and bidding systems 16(1)-16(6), although system 10 may have other numbers(n) of or different combinations of each of these systems 12(n), (14(n), 16(n), including a single system, such as an offer processing system 12. The offer processing system is operatively coupled to the auction systems 14(1) and 14(2); auction system 14(1) is operatively coupled to bidding systems 16(1)-16(4); and auction system 14(2) is operatively coupled to bidding systems 16(5) and 16(6). A variety of communication systems or methods can be used to operatively couple and communicate between the offer processing system 12 to each of the auction systems 14(1) and 14(2) and to operatively couple and communicate between the auction systems 14(1) and 14(2) to each of the bidding systems 16(1)-16(6) including a direct connection, a local area network, a wide area network, the world wide web, modems and phone lines, or wireless communication technology, each having communications protocols. Although one configuration for the system 10 is shown, other configurations are possible and envisioned, such as operatively coupling the offer processing system 12 to other numbers of auctioning systems 14(n) or to none at all if the offer or bid information is input into or is otherwise already stored in one or more memory storage devices in the offer processing system 12.

The offer processing system 12 includes a processor 18, a memory storage device 20, and an input/output user interface 22, a display device 24, and a user input device 26 which are coupled together by a bus or other link 28, although the offer processing system 12 can be comprised of other combinations of components. The processor 18 executes a program 30 of stored instructions for the method for determining latent demand for at least one of a plurality of commodities as described herein and set forth with reference to FIG. 2. Although one processor 18 is shown, the offer processing system 12 can have multiple processors to execute the programmed instructions and the processor 18 or processors can be located elsewhere in the system 10, such as in one or more of the auction systems 14.

The memory storage device 20 stores at least one program 30 with instructions for the method for determining latent demand for at least one of a plurality of commodities for execution by the processor 18. A variety of different types of memory storage devices, such as a random access memory (RAM) or a read only memory (ROM) in the system or a floppy disk, hard disk, or CD ROM which is read from and written to by a magnetic or optical reading and writing system that is coupled to one or more of the processors, can be used to store these programmed instructions, as well as other information. The offer processing system 12 can have multiple memory storage devices to store the programmed instructions. The memory storage devices, as well as some or all of the programmed instructions, can be located and stored elsewhere in the system 10, such as in one or more of the auction systems 14.

The input/output user interface 22 is used to operatively couple and communicate between the offer processing system 12 to the auction systems 14(1) and 14(2) as discussed earlier.

The display device 24 displays information for the operator, such as the commodity selected based on an analysis of prior offers. A variety of different types of display devices 24 can be used, such as a monitor, printer, or any other type of device, which can convey information to the user of the computer system. Again, although only one display device 24 is shown, the system can have more than one display device 24 and the display device 24 can be located elsewhere in the system, such as in one or more of the auction systems 14.

The user input device 26 enables an operator to generate and transmit signals or commands to the offer processing system 12. A variety of different types of user input devices 26 can be used, such as a keyboard, computer mouse, or any other user input device, which provides a mechanism for a user or operator. The offer processing system 12 can have more than one user input device 26 and the user input device 26 can be located elsewhere in the system, such as in one or more of the auction systems 14.

Each of the auction systems 14(1) and 14(2) is a computer system with a processor that executes programmed instructions stored in a memory used to receive offers or bids from the bidding systems 16(1)-16(6) for different commodities, to transfer the information regarding the offers on the commodities to the offer processing system 12, and to notify the bidding system 16 with the winning offer or bid for a particular commodity, typically the highest bid. However, other types of systems and devices can be used for each of the auction systems 14 and each auction system 14 can be programmed with other instructions for execution by its processor, such as storing or processing the received bids. Each of the auction systems 14 may be operatively coupled to a plurality of bidding systems 16, although other configurations are possible. For example, each of the auction system 14 could be coupled to other sources of offers or bids which are input or otherwise stored in one or more memory storage devices in each of the auction systems 14.

Each of the bidding systems 16 is a computer system that executes programmed instructions to enable the operator of the bidding system to receive information about and to bid on one or more commodities, although other types of systems or devices could also be used for the bidding system 16, such as a user input device, for instance, a keyboard or mouse, coupled to the auction system. Each of the bidding systems 16 may be operatively coupled to one of the auction systems 14 in this particular embodiment, although other configurations are possible, such as having one or more of the bidding systems 16 operatively coupled to multiple auction systems 14 or to the offer processing system 12. A variety of different types computer systems can be used for the bidding systems 16, such as personal desktop computers, workstations, Palm® computers, hand held computers, Internet ready cellular/digital mobile telephones, dumb terminals or any other larger or smaller computer system.

The operation of system 10 and method for determining latent demand for at least one of a plurality of commodities will be discussed with reference to FIGS. 1-3. At step 32, the method begins and then in step 34 offers for the commodities are obtained from auction system 14(1). In this particular example auction, items A, B, and C, which each may be a good or a service, are offered individually and in various combinations to form different commodities. The commodities are designated with the letters A, B, C, AB, AC, BC, and ABC, where the letter in the designation of the commodity represents the item or items in that particular commodity.

Auction systems 14(1) and 14(2) receive the bids or offers from one or more of the bidding systems 16(1) and 16(6) for commodities and transmits the bids for each of the commodities to the offer processing system 12. The bids or offers are amounts that the bidders are willing to pay for the particular commodity being auctioned. The auction systems 14(1) and 14(2) can transmit the bid information on each commodity in a variety of different ways, such as when the bids come in, after the auction is over, or when polled by the offer processing system 12. In this particular embodiment, both the accepted and the unaccepted bids or offers for the commodities are transmitted to the offer processing system 12 from the auction system 14(1), although other bid information could be sent, such as just the unaccepted bids for these commodities. In this particular example, the bids or offers submitted by the bidders 1, 2, 3, and 4 from bidding systems 16(1)-16(4) for the commodities A, B, C, AB, AC, BC, and ABC to auction system 14(1) are set forth in the table in FIG. 3.

In addition to transmitting the bids or offers, the auction systems 14(1) and 14(2) may also store the bids and eventually select the winning bids from the bidding systems 16(1)-16(6), typically the highest bid or bids for the commodity or commodities. In this particular example, auction system 14(1) has notified bidder 1 from bidding system 16(1) that it has won commodity C with a high bid of six and has notified bidder 2 from bidding system 16(2) that it has won commodity AB with a bid of twelve.

Next, in step 36, the offer processing system 12 waits until it has received a sufficient number of offers or bids for the commodities. The number of offers or bids needed for each of the commodities can vary as needed or desired and can be set by the operator for the particular application using the user input device 26. If the offer processing system 12 has not received enough offers for the different commodities, then the "No" branch is taken from step 36 back to step 34 and the offer processing system 12 waits to receive or polls the auction system 14(1) or auction system 14(2) for more offers or bids on the commodities.

Although in this particular example, the bids or offers are obtained from bidding systems 16(1)-16(4) operatively coupled to one auction system 14(1), the offers can be obtained from multiple auctions conducted by one or more of the auction systems 14(n). Additionally, auctions on the same types of commodities do not need to take place at substantially the same time and the types of auctions conducted can vary. Further, the auction may be electronically automated and, for example, be conducted on the Internet, although the auction could be conducted using other forums and systems.

When a sufficient number of offers has been received, then the "Yes" branch is taken from step 36 and the offer processing system 12 begins to analyze the offers for each of the commodities by each of the bidders(n) in step 38. In this particular embodiment, the offer processing system 12 uses the accepted and the unaccepted offers in the analysis to identify a highly valued commodity, although the offer processing system 12 may use other portions of the bid information, such as just the unaccepted offers and may identify more than one highly valued commodity. The particular analysis conducted by the offer processing system 12 can vary based on the particular application. For example, one analysis which can be conducted to identify a highly valued commodity involves: determining a sum total of the offers for each of the plurality of commodities from the received unaccepted and accepted offers for each of the commodities; dividing each of the sum total offers by the total number of offers for each of the plurality of commodities to obtain an average offer for each of the plurality of commodities; and then dividing each of the average offers by the number of items, that is, the number of goods or services, in each of the plurality commodities, to obtain an analyzed value for each of the plurality of commodities.

By way of example only, using this analysis: the total offer price for commodity A was 7, the total number of offers was 4, the average offer was 1.75, and the analyzed value for commodity A was 1.75; the total offer price for commodity B was 6, the total number of offers was 4, the average offer was 1.5, and the analyzed value for commodity B was 1.5; the total offer price for commodity C was 15, the total number of offers was 4, the average offer was 3.75, and the analyzed value for commodity C was 3.75; the total offer price for commodity AB was 22, the total number of offers was 4, the average offer was 5.5, and the analyzed value for commodity AB was 2.75; the total offer price for commodity AC was 31, the total number of offers was 4, the average offer was 7.75, and the analyzed value for commodity AC was 3.875; the total offer price for commodity BC was 23, the total number of offers was 4, the average offer was 5.75, and the analyzed value for commodity BC was 2.875; and the total offer price for commodity ABC was 41, the total number of offers was 4, the average offer was 10.25, and the analyzed value for commodity ABC was 3.417 as shown in the table, in FIG. 3 Although one particular analysis is discussed, the offer processing system 12 can be programmed with instructions to be executed by the processor 18 to carry out other types of analyses for different applications.

Once the analysis is completed in step 38, then the offer processing system 12 selects the highly valued commodity based on at least one criteria in step 40. In this particular embodiment, the criteria is the highest numerical value for the analyzed value and in this particular example that is commodity AC with an analyzed value of 3.875 as shown in FIG. 3. The selected commodity or commodities based on the analysis can be shown on the output display device 24. As this example illustrates, the winning bids were for commodities AB and C which were sold, but the analysis shows that the commodity AC has the highest analyzed value demonstrating a latent demand for this particular commodity which was not sold. As a result, this particular commodity may now be offered for sale. Although in this particular embodiment, one criteria is used and the criteria is the highest numerical value, other numbers of criteria can be used and different criteria can be set by the operator as appropriate for the particular application using the user input device 26.

Next, the method may include the optional step of setting a price for the selected commodity in step 42. If a price is not going to be selected for the commodity, then the "No" branch is taken from step 42 to step 48 where the method ends. If a price for the commodity is to be selected, then the "Yes" branch is taken from step 42 to step 44 where the offers for the selected commodity are averaged. Next, in step 46 a price for the selected one of the commodities is determined based on the average offer determined in step 44. Here, the selected price for the selected commodity is the average offer, although other prices for the commodity can be used. Once the price is set, then the branch is taken from step 46 to step 48 where the method ends.

Accordingly, the present invention is able to identify a commodity or commodities, in particular, a combination of goods and services, that are highly valued based on an analysis of at least the unaccepted bid information, and typically all of the bid information, that is, the accepted and unaccepted bid information. The present invention is also useful in identifying potential demand and sales volumes, as well as pricing, for a commodity based on this previously unused bid information.

Having thus described the basic concept of the invention, it would be apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Accordingly, the invention is limited only by the following claims and equivalents thereto.

What is claimed is:

1. A system for commodity valuation based on online auction bid information, comprising:
   an auction system to maintain information about a plurality of commodities, wherein each commodity is comprised of one or more items, and auction bids for each of the plurality of commodities;
   a bidding system to receive and enter the auction bid information for the plurality of commodities into the auction system;
   an offer processor system, comprising:
      a bid evaluator to identify the auction bid information that has been offered for each of the commodities while at auction online;
      a bid processor to determine an average offer for each commodity using the auction bid information from the auction, wherein the average offer is determined from a total number of offers for each commodity;
      a commodity evaluator comprising:
         an item information module to identify a total number of items for each commodity;

a calculating module to obtain a quotient comprised of dividing the average offer for each commodity by the total number of items in the commodity; and a designator module to designate the quotient as an analyzed valuation for each commodity;

a criteria definition module to define a criterion, wherein the criterion comprises the highest calculated quotient; and a commodity identifier to identify one or more commodities that have an analyzed valuation that satisfies the criterion;

a display device to display the one or more commodities identified and their analyzed valuations; and a network communication system to operatively couple and provide communication between the offer processing system and the auction system and to operatively couple and provide communication between the auction system and the bidding system.

2. A system according to claim 1, wherein the determination of the analyzed valuations is deferred until sufficient auction bid information becomes available for evaluation.

3. A system according to claim 1, further comprising:
a pricing processor to set a price for each of the commodities identified at which the commodity will be offered for sale.

4. A system according to claim 3, further comprising:
an averager to determine the price as an average of the auction bid information.

5. A system according to claim 1, wherein the auction bid information is chosen from the group comprising accepted bids and unaccepted bids.

6. A system according to claim 5, wherein the auction bid information having a highest value within the group for each of the commodities is chosen.

7. A system according to claim 1, wherein the criterion is specified for at least one of latent demand, potential demand, and sales volume.

8. A system according to claim 1, wherein the commodity is selected from the group comprising goods, service, and combination of goods and service.

9. A method for commodity valuation based on online auction bid information, comprising:
maintaining in a database electronically stored information about a plurality of commodities, wherein each commodity is comprised of one or more items, and auction bids for each of the plurality of commodities;
processing the auction bid information on a computer processor coupled to a memory comprising:
retrieving the auction bid information from the database into the memory;
identifying the auction bid information that has each been offered for the commodities while at auction online;
identifying a total number of items for each commodity;
determining an average offer for each commodity using the auction bid information from the auction, wherein the average offer is determined from a total number of offers for each commodity;
obtaining a quotient comprising the average offer for each commodity divided by the total number of items in the commodity;
designating the quotient as an analyzed valuation for each commodity;
defining a criterion, wherein the criterion comprises the highest calculated quotient; and
identifying one or more commodities that have an analyzed valuation that satisfies the criterion;

electronically displaying on a display device the one or more commodities identified and their analyzed valuations; and maintaining a network communication system to operatively couple and provide communication between the database and computer processor coupled to the memory.

10. A method according to claim 9, further comprising:
deferring the determination of the analyzed valuations until sufficient auction bid information becomes available for evaluation.

11. A method according to claim 9, further comprising:
setting a price for each of the commodities identified at which the commodity will be offered for sale.

12. A method according to claim 11, further comprising:
determining the price as an average of the auction bid information.

13. A method according to claim 9, further comprising:
choosing the auction bid information from the group comprising accepted bids and unaccepted bids.

14. A method according to claim 13, further comprising:
choosing the auction bid information having a highest value within the group for each of the commodities.

15. A method according to claim 9, further comprising:
specifying the criterion for at least one of latent demand, potential demand, and sales volume.

16. A method according to claim 9, wherein the commodity is selected from the group comprising goods, service, and combination of goods and service.

17. A computer-executable storage medium holding code for commodity valuation based on online auction bid information, comprising:
code for maintaining in a database information about a plurality of commodities, wherein each commodity is comprised of one or more items, and auction bids for each of the plurality of commodities;
code for processing the auction bid information on a computer processor coupled to a memory comprising:
code for retrieving the auction bid information;
code for identifying the auction bid information that has each been offered for one of the commodities while at auction online, to determine analyzed valuations following completion of the auction;
code for identifying a total number of items for each commodity;
code for determining an average offer for each commodity using the auction bid information from the auction, wherein the average offer is determined from a total number of offers for each commodity;
code for obtaining a quotient comprising the average offer for each commodity divided by the total number of items in the commodity;
code for designating the quotient as an analyzed valuation for each commodity;
code for defining a criterion, wherein the criterion comprises the highest calculated quotient; and
code for identifying one or more commodities that have an analyzed valuation that satisfies the criterion;
code for displaying on a display device the one or more commodities identified and their analyzed valuations; and
code for maintaining a network communication system to operatively couple and provide communication between the database and computer processor coupled to the memory.

* * * * *